United States Patent [19]
Takemura et al.

[11] Patent Number: 5,012,399
[45] Date of Patent: Apr. 30, 1991

[54] SELF-OSCILLATION TYPE CONVERTER

[75] Inventors: Hiroshi Takemura; Yasuji Okamoto, both of Kyoto, Japan

[73] Assignee: Murata Manufacturing Co., Ltd., Japan

[21] Appl. No.: 447,216

[22] Filed: Dec. 7, 1989

[30] Foreign Application Priority Data

Dec. 9, 1988 [JP] Japan .................. 63-312645

[51] Int. Cl.$^5$ .......................................... H02M 3/338
[52] U.S. Cl. ...................................... 363/18; 363/19; 323/902
[58] Field of Search .................. 363/18, 19, 22, 23, 363/17, 20, 21; 323/902

[56] References Cited

U.S. PATENT DOCUMENTS

| | | | |
|---|---|---|---|
| 4,573,112 | 2/1986 | Numata et al. | 363/19 |
| 4,605,998 | 8/1986 | Higashi | 363/19 |
| 4,654,771 | 3/1987 | Stasch et al. | 363/19 |
| 4,737,898 | 4/1988 | Banfalvi | 363/19 |
| 4,758,937 | 7/1988 | Usui et al. | 363/19 |
| 4,763,235 | 8/1988 | Morita | 363/19 |
| 4,763,236 | 8/1988 | Usui | 363/19 |
| 4,862,338 | 8/1989 | Tanaka | 363/19 |
| 4,882,663 | 11/1989 | Nilssen | 363/19 |

Primary Examiner—Steven L. Stephan
Assistant Examiner—Emanuel T. Voeltz
Attorney, Agent, or Firm—Ostrolenk, Faber, Gerb & Soffen

[57] ABSTRACT

A self-oscillation type converter comprises a transformer and a switching transistor. The switching transistor is connected in series to a primary winding of the transformer. A start current is applied from a power supply line to the switching transistor through a start resistor, so that the switching transistor is rendered conductive. A positive feedback is performed through an application of a constant current from a constant current circuit to a base of the switching transistor in response to a voltage generated from a feedback winding, whereby the switching transistor is turned on rapidly. A CR time constant circuit is connected to an output of the constant current circuit. An output of the CR time constant circuit is applied to the base of the transistor, a transistor Q2 is turned on after a lapse of time determined by a time constant of the time constant circuit, so that the switching transistor is forcibly turned off. A voltage outputted to a secondary winding is detected by a voltage comparing circuit. If the outputted voltage becomes higher than a reference voltage, a resistance value of the CR time constant circuit is decreased by a photocoupler, maintaining a turning-on time period of the switching transistor to be constant.

8 Claims, 3 Drawing Sheets

SELF-OSCILLATION TYPE CONVERTER

BACKGROUND OF THE INVENTION

1. Field of the Invention

The present invention relates generally to self-oscillation type converters. More particularly, the present invention relates to self-oscillation type converters for use in a constant voltage power supply circuit and the like.

2. Description of the Background Art

Conventionally, a self-oscillation type DC-DC converter is generally used as a low-price switching regulator having a relatively low output capacity.

FIG. 1 is an electric circuit diagram of a conventional self-oscillation type DC-DC converter having one transistor which is generally referred to as a ringing choke converter. Referring to FIG. 1, a transformer 1 includes a primary winding Np, a secondary winding Ns and a feedback winding Nb, and one end of the primary winding Np is connected to a first input power supply line and the other end thereof is connected to a collector of a switching transistor Q1. One end of the feedback winding Nb is connected to a base of the switching transistor Q1 through a diode D2 and a resistor R3. The other end of the feedback winding Nb is connected to an emitter of the switching transistor 01 and a second input power supply line. A start resistor R2 is connected between the base of the switching transistor Q1 and the first input power supply line. In addition, a rectifying diode D1 is connected in series with the secondary winding Ns of the transformer 1 and a smoothing capacitor C2 is connected in parallel.

Now, the operation of the self-oscillation type DC-DC converter shown in FIG. 1 will be described. First, an application of a voltage to the input power supply line causes a current flow through the start resistor R2 to the base of the switching transistor Q1, rendering the switching transistor Q1 conductive. As a result, a voltage is applied to the primary winding Np of the transformer 1 and at the same time a voltage is generated in the feedback winding Nb. The voltage generated in the feedback winding Nb becomes a positive feedback voltage which further renders the switching transistor Q1 conductive, whereby the switching transistor Q1 is rapidly turned on. At this time, a voltage of the secondary winding Ns of the transformer 1 is applied to the diode D1 in a reverse direction, and energy is stored in the transformer 1 by the current flowing through the primary winding Np. Thereafter, when the base current cannot maintain the saturation state of the switching transistor Q1 due to the increased current of the switching transistor Q1, the collector-emitter voltage of the switching transistor Q1 is increased, so that the voltage of the primary winding Np of the transformer 1 falls. As a result, a voltage of the feedback winding Nb also falls. Since this change is positively feed back to the switching transistor Q1, the switching transistor Q1 is rapidly turned off. After the switching transistor Q1 is turned off, the energy stored in the transformer 1 is supplied to the output side through the rectifying diode D1.

As described in the foregoing, a positive feedback of the feedback winding Nb of the transformer 1 to the base of the switching transistor Q1 enables a self-oscillation type converter to be structured by simple circuits.

The general ringing choke converter shown in FIG. 1 is not provided with a stable protecting function against an over-load. Assuming that the maximum base current of the switching transistor Q1 is constant, the maximum collector current depends on the hfe (direct current amplification rate) of the switching transistor Q1. Accordingly, although this hfe serves as a protecting function against the over-load, the hfe varies greatly among switching transistors, which prevents a stable protecting operation against the over-load.

SUMMARY OF THE INVENTION

Therefore, a primary object of the present invention is to provide a self-oscillation type converter having an over-current protecting function in which an over-current protecting operation starts at a stable point irrespective of any variation of the hfe of a switching transistor.

Briefly stated, the present invention is directed to a self-oscillation type converter in which a switching transistor is connected to a primary winding of a transformer and a voltage generated in a feedback winding of the transformer is feed back to a control electrode of the switching transistor, and a constant current is supplied to the control electrode of the switching transistor from a constant current circuit in response to the voltage generated in the feedback winding. A time constant circuit is provided to define a time period which starts from a generation of a voltage in the feedback winding and continues until the end of a turning-on time period of the switching transistor, and the switching transistor is forcibly turned off according to an output of the time constant circuit.

Hence, according to the present invention, irrespective of the of the switching transistor, a turning-on time period of the switching transistor can be defined, so that a stable protecting operation can be performed against an over-current.

In a preferred embodiment, a constant current circuit comprises a transistor connected between a feedback winding and a control electrode of a switching transistor, and a constant current element for providing a constant current to the control electrode of the transistor, and in which a constant current is supplied to the control electrode of the switching transistor in response to a voltage of the feedback winding becoming a predetermined voltage.

In a more preferred embodiment, an alternating voltage generated in a secondary winding of a transformer is rectified, so that a direct voltage is outputted, whereby it is detected by a voltage comparing circuit whether the direct voltage exceeds a predetermined voltage or not. A light-emitting element of a photocoupler is connected to an output of the voltage comparing circuit, and a light-receiving element photocoupled to the light-emitting element is connected in parallel to a resistor of a time constant circuit. If it is detected by the voltage comparing circuit that the direct voltage exceeds a predetermined voltage, the light-emitting element emits light and the light-receiving element receives the light, so that a resistance value of the time constant circuit is decreased.

Hence, according to the more preferred embodiment of the present invention, a time constant of the time constant circuit can be changed according to a voltage supplied to a load, which is outputted from the secondary winding, and an output can be controlled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
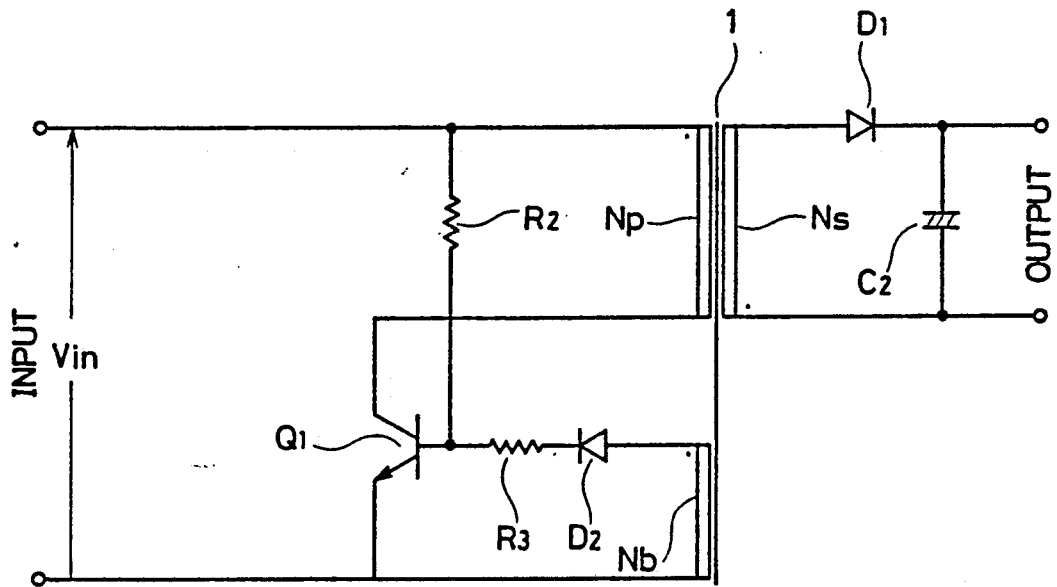
FIG. 1 is an electric circuit diagram of a main part of a conventional self-oscillation type converter.
Figure 2:
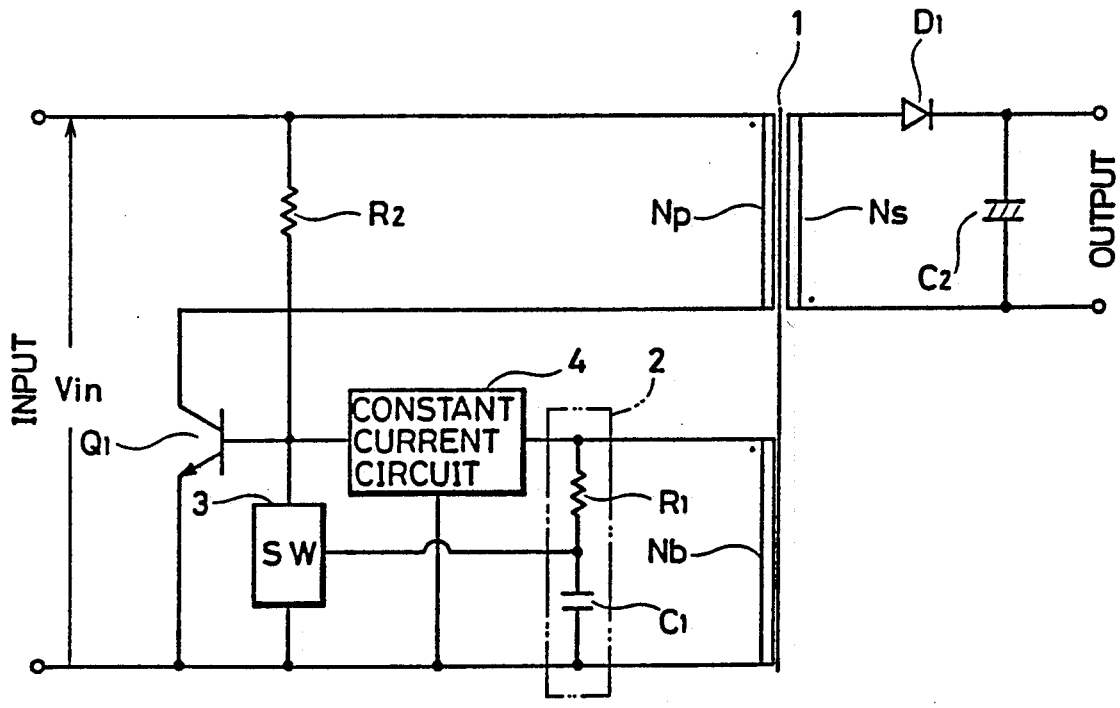
FIG. 2 is an electric circuit diagram showing a structure of a first embodiment of the present invention.

FIG. 2 is an electric circuit diagram showing a structure of a main part of a first embodiment of the present invention. The self-oscillation type converter shown in FIG. 2 is identical to that in FIG. 1 except for the following points. That is, a CR time constant circuit 2 comprising a resistor R1 and a capacitor C1 is connected between one end and the other end of the feedback winding Nb of the transformer 1. One end of the CR time constant circuit is connected to the base of the switching transistor Q1 through a constant current circuit 4. A switching circuit 3 is provided between the base of the switching transistor Q1 and the input power supply line, and a control input of the switching circuit 3 is connected to a connection point of the resistor R1 and the capacitor C1 of the CR time constant circuit 2. The CR time constant circuit 2 is provided to define a time period which starts from a generation of a voltage in the feedback winding Nb and continues until the end of a turning-on time period of the switching transistor Q1. The constant current circuit 4 is provided to supply a constant current to the switching transistor Q1 according to a voltage generated in the feedback winding Nb, and the switching circuit 3 is provided to forcibly turn off the switching transistor Q1 according to an output of the CR time constant circuit 2.

Now, the operation of the self-oscillation type converter shown in FIG. 2 will be described. The switching transistor Q1 is rendered conductive in response to a start current of the start resistor R2. Thereafter, a positive feedback is performed through an application of a constant current to the base of the switching transistor Q1 from the constant current circuit 4 in response to a voltage generated from the feedback winding Nb, turning on the switching transistor Q1 rapidly. After a lapse of time which is determined by a time constant of the CR time constant circuit 2, the switching circuit 3 is turned on, whereby a base current of the switching transistor Q1 is shunted, and the switching transistor Q1 is forcibly turned off. Accordingly, a turning-on time period of the switching transistor Q1 is defined by the time constant of the CR time constant circuit 2. A maximum energy stored in the transformer 1 is limited and a maximum current supplied to a load is determined by the predetermined time constant. In addition, since the switching transistor Q1 is driven with a constant-current by the constant current circuit 4, its switching operation becomes stable.

When an switching transistor Q1 having a hfe of the lowest rank is used, any variation of over-current protecting operation starting points, which is caused due to a variation of the, can be prevented by determining, before a collector current of the switching transistor Q1 reaches a maximum value, a time constant by which the switching transistor Q1 is forcibly turned off by a function of the CR time constant circuit 2 and the switching circuit 3.

Figure 3:
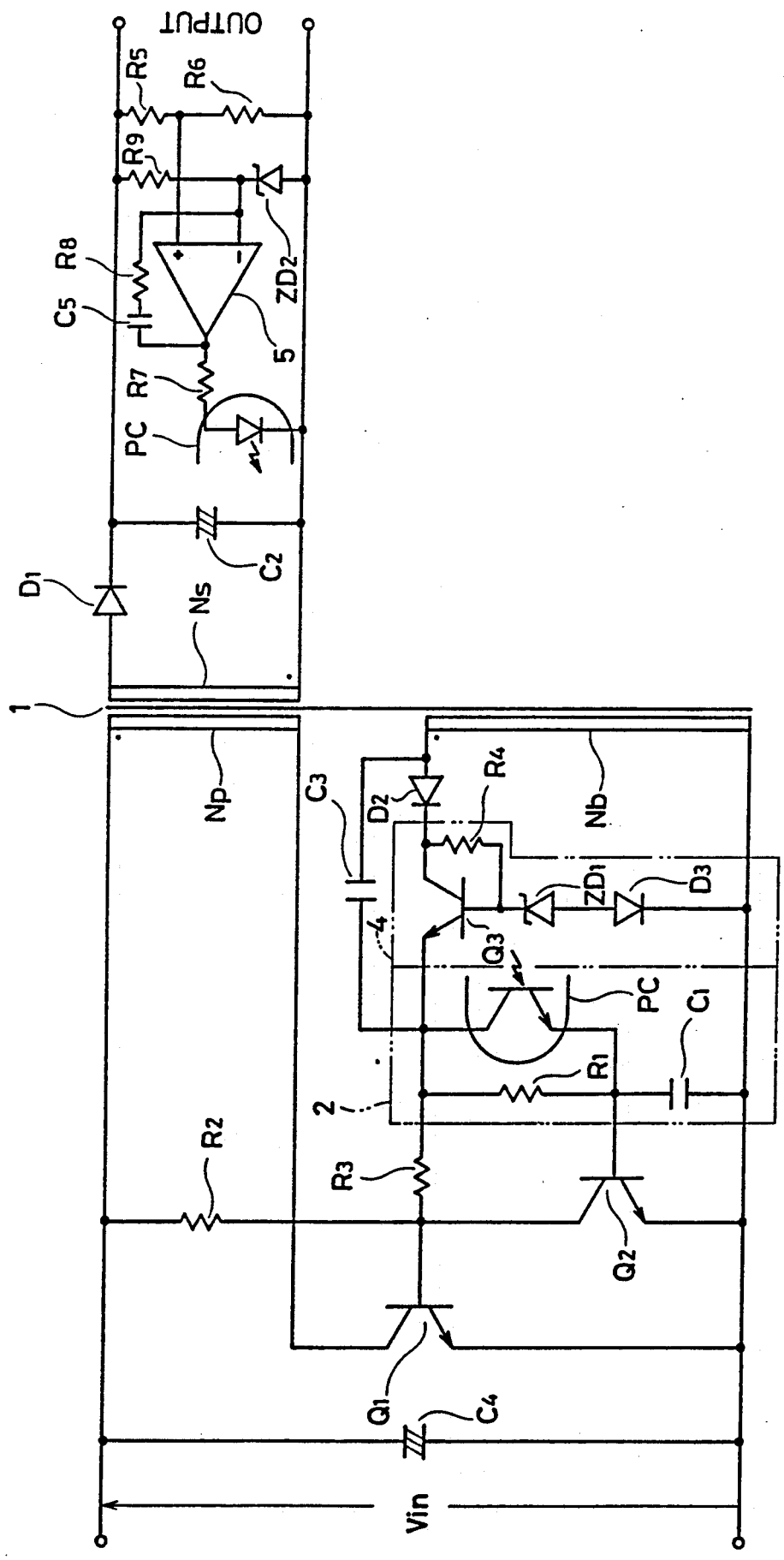
FIG. 3 is a more detailed electric circuit diagram of the first embodiment of the present invention.

FIG. 3 is a detailed electric circuit diagram of one the first embodiment of the present invention. The circuit diagram shown in FIG. 3 is identical to that of FIG. 2 except for the following points. A capacitor C4 is connected between the input power supply lines. One end of the feedback winding Nb is connected to the base of the switching transistor Q1 through a reverse-flow preventing diode D2, a collector and an emitter of a transistor Q3 (included in the constant current circuit 4) and a resistor R3. In addition, a speed-up capacitor C3 is connected between one end of the feedback winding Nb and the emitter of the transistor Q3. A bias resistor R4 is connected between the collector and a base of the transistor Q3, and a Zener diode ZD1 and a reverse-flow preventing diode D3 are connected between the base of the transistor Q3 and the second input power supply line.

A photo transistor of a photocoupler PC is connected in parallel to the resistor R1. A connection point of the resistor R1 of the CR time constant circuit 2 and the capacitor C1 is connected to the base of the transistor Q2 constituting the switching circuit 3 shown in FIG. 2. A collector of the transistor Q2 is connected to the base of the switching transistor Q1 and an emitter thereof is connected to the second input power supply lines.

The rectifying diode D1 and the smoothing capacitor C2 are connected to the secondary winding Ns of the transformer 1, and in addition, resistors R5 and R6 are connected in series between output lines and also a resistor R9 and a Zener diode ZD2 are connected thereto. The resistors R5 and R6 are provided for dividing voltage between the output lines, and a divided voltage is applied to a compare input terminal of a comparator 5 as a voltage comparing circuit. The resistor R9 and the Zener diode ZD2 generate a reference voltage which is applied to a reference input terminal of the comparator 5. A series circuit of a transistor R8 and a capacitor C5 is connected between the reference input terminal and an output terminal of the comparator 5. The comparator 5 compares a voltage between output lines divided by the resistors R5 and R6 with the reference voltage and when the divided voltage becomes higher than the reference voltage, it causes a current to flow to a light-emitting diode of the photocoupler PC through a resistor R7.

Now, the operation of the self-oscillation type converter shown in FIG. 3 will be described. First, when the input power supply is applied between the input lines, a base current flows to the switching transistor Q1 through the start resistor R2, rendering the switching transistor conductive. As a result, a voltage is applied to the primary winding Np of the transformer 1, and at the same time a voltage is generated in the feedback winding Nb. When the voltage exceeds a value which is obtained by adding forward voltage of the diodes D2 and D3 to a Zener voltage of the Zener diode ZD1, a Zener current flows to the Zener diode ZD1, so that a cathode potential of the Zener diode ZD1, that is, a base potential of the transistor Q3 becomes a sum of the Zener voltage of the Zener diode ZD1 and the forward voltage drop of the diode D3, resulting in a stabilization. As a result, the base current of the transistor Q3 becomes constant, and a collector current of the transistor Q3, that is, a constant current flows to the base of the switching transistor Q1. Therefore, the switching transistor Q1 is rapidly turned on.

At this time, since a voltage of the secondary winding Ns of the transformer 1 is applied to the rectifying diode D1 in reverse direction, no current flows to the secondary winding Ns and energy is stored in the transformer 1. At the same time, a charged current flows to the capacitor C1 of the CR time constant circuit 2 through the resistor R1 and the photo transistor of the photocoupler PC, whereby the base potential of the transistor Q2 gradually rises.

Thereafter, when the charged voltage of the capacitor C1 reaches a predetermined value and the transistor Q2 starts to be turned on, the base current of the switching transistor Q1 is shunted to the transistor Q2 and decreased, so that the switching transistor Q1 cannot be maintained in saturation state, the voltage of the primary winding Np is also decreased and the voltage of the feedback winding Nb is decreased. Since this change is caused due to a positive feedback, the switching transistor Q1 is rapidly turned off. The stored energy in the transformer 1 is supplied from the secondary winding Ns of the transformer 1 to the output side due to the turning-off of the switching transistor Q1. Thereafter, when the voltage of the feedback winding Nb becomes 0, the switching transistor Q1 is once again turned on through the current of the start resistor R2. A self-oscillating operation is performed by the repetition of the above described operation.

If the output side of the transformer 1 is over-loaded for some reason, the stored energy is rapidly discharged to the load side from the transformer 1 during a turning-off period of the switching transistor Q1. However, since the turning-on time period of the switching transistor Q1 is defined by the time constant of the CR time constant circuit 2, a maximum energy stored in the transformer 1 is fixed, and as a result, a maximum load current is defined.

The operation will be as follows when a voltage supplied to a load changes according to a state of the load. More specifically, if the voltage supplied to the load rises, divided voltage of the resistors R5 and R6 rises, so that the comparator 5 detects that the divided voltage exceeds the reference voltage, and increases an output voltage, increasing an amount of light emission of the light-emitting diode of the photocoupler PC. As a result, an impedance between a collector and an emitter of the photo transistor of the photocoupler PC connected in parallel to the resistor R1 is decreased and the time constant of the CR constant circuit 2 is reduced. As a result, a turning-on time period of the switching transistor Q1 is reduced, and consequently a rectifying smoothing voltage of an output of the secondary winding Ns of the transformer 1 is decreased, whereby the voltage supplied to the load is decreased down to a predetermined value. If the voltage supplied to the load is decreased, the rectifying smoothing voltage of the output of the secondary winding Ns rises through the reverse operation, resulting in a stable voltage supplied to the load.

In the example shown in FIG. 3, since the CR time constant circuit 2 functions to a signal whose current is made constant by the constant current circuit 4, the turning-on time period of the switching transistor Q1 can be maintained constant even if the input power supply voltage Vin changes.

Figure 4:
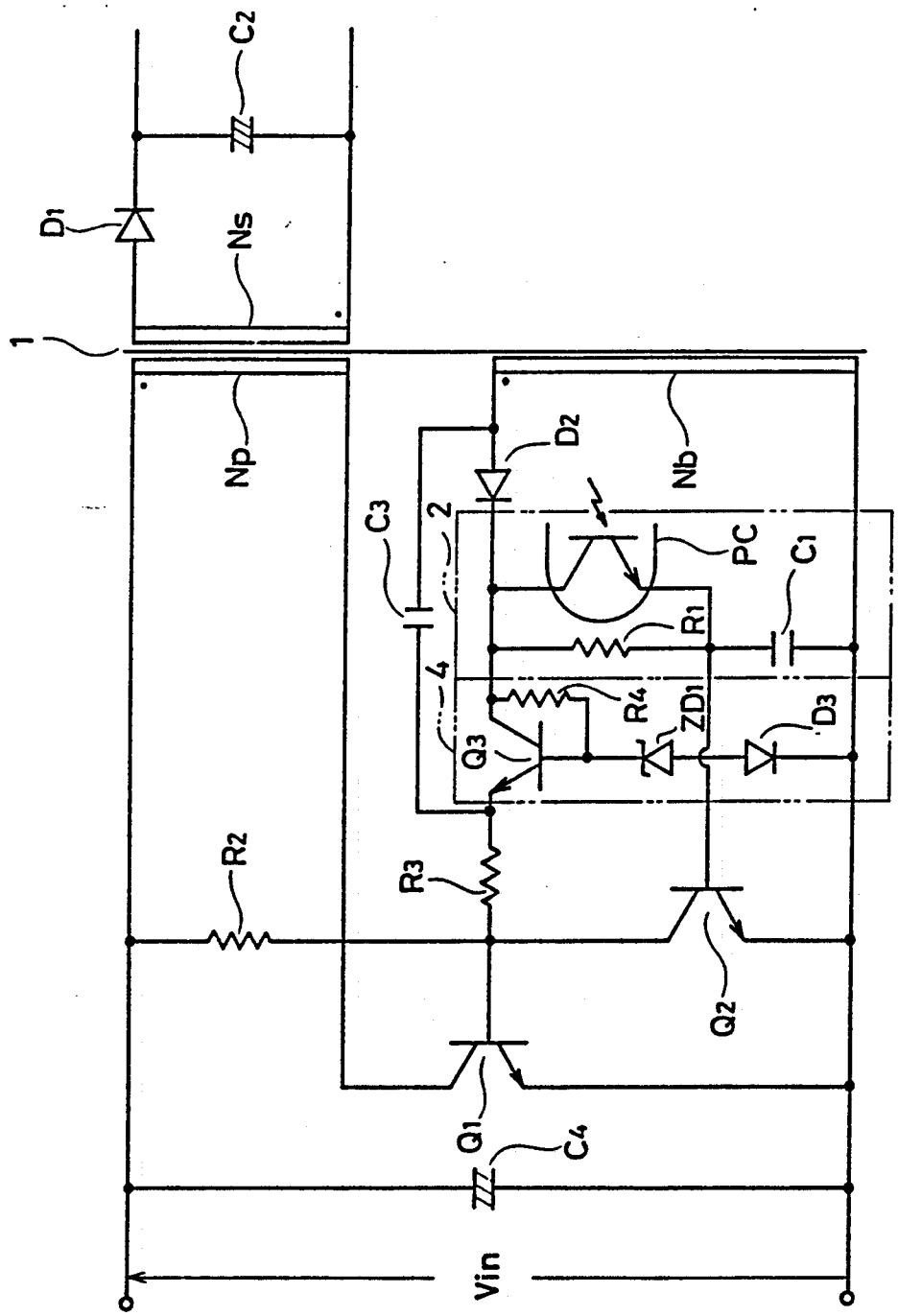
FIG. 4 is an electric circuit diagram of a main part of another embodiment of the present invention.

FIG. 4 is an electric circuit diagram of another embodiment of the present invention. The embodiment shown in FIG. 4 is the same as the above described embodiment shown in FIG. 3 except that the constant current circuit 4 is provided following the stage of the CR time constant circuit 2. Even in the circuit structure shown in FIG. 4, the turning-on time of the switching transistor Q1 ca be defined by a time constant of the CR time constant circuit 2. Especially in the embodiment shown in FIG. 4, since an output voltage of the feedback winding Nb of the transformer 1 is directly applied to the CR time constant circuit 2, the turning-on time period of the switching transistor Q1 can be correctly defined when the input power supply voltage Vin is constant.

As described in the foregoing, according to the present invention, a stable protecting operation can be performed to an over-current because a turning-on time period of the switching transistor 1 can be defined irrespective of hfe of the switching transistor 1. In addition, if it is structured such that a time constant of the CR time constant circuit 2 can be changed according to a voltage supplied to a load and the like, an output can be controlled at the same time. Furthermore, a stable self-oscillating operation can be performed while reducing a variation of characteristics of the switching transistor 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-oscillation type converter comprising a transformer having a primary winding and a feedback winding, and a switching transistor having a control electrode and being connected to the primary winding of the transformer, a voltage generated in the feedback winding of said transformer being fed back to the control electrode of said switching transistor, comprising in the following order:

constant current means for receiving a voltage generated in said feedback winding and supplying a constant current through a control resistor to said control electrode of the switching transistor in response to said voltage generated in the feedback winding, time constant means for receiving an output of said constant current means and defining a time period which starts from generation of said voltage in said feedback winding and continues until the end of a turning-on time period of said switching transistor, and switching means for receiving an output of said time constant means and forcibly turning off said switching transistor according to said output of said time constant means.

2. A self-oscillation type converter according to claim 1, wherein said constant current means comprises:

a second transistor having a control electrode, a first electrode connected to one end of said feedback winding, and a second electrode connected to said control electrode of the switching transistor, and providing a constant current to said control electrode of the switching transistor, and a constant current element providing constant current to said control electrode of the second transistor in response to a predetermined voltage, and means at one end of said feedback winding for providing said predetermined voltage to said constant current element.

3. A self-oscillation type converter according to claim 1, wherein said time constant means includes a series circuit comprising a time constant resistor and a time constant capacitor, connected to a connection point between said control resistor and the constant current output of said constant current means.

4. A self-oscillation type converter according to claim 3, wherein said transformer has a secondary winding, and wherein said converter further comprises:
rectifying means for rectifying an alternating voltage generated in said secondary winding of the transformer and thereby outputting a direct current voltage,
voltage comparing means for detecting whether said direct current voltage rectified by said rectifying means exceeds a predetermined voltage, and
photocoupling means including a light-emitting element and a light receiving element photocoupled to each other, said light-emitting element being connected to an output of said voltage comparing means and emitting light in response to the detection, by said voltage comparing means, of an occurrence of said direct current voltage exceeding said predetermined voltage, and said light-receiving element being connected in parallel with said resistor of the time constant means, and decreasing a resistance value of said parallel combination of said resistor and said light-receiving element in response to a light emission of said light-emitting element.

5. A self-oscillation type converter according to claim 3, wherein said feedback winding has two ends, and said time constant means is connected to both ends of said feedback winding.

6. A self-oscillation type converter according to claim 3, wherein said time constant means is connected to an output terminal of said constant current means.

7. A self-oscillation type converter according to claim 1, wherein said constant current means comprises:
a second transistor having a control electrode, a first electrode connected to one end of said feedback winding, and a second electrode, connected to said control electrode of the switching transistor, and providing a constant current to said control electrode of the switching transistor,
a bias resistor interconnecting said first electrode and said control electrode of said second transistor, and
means at one end of said feedback winding for providing a predetermined voltage to said control electrode of said second transistor.

8. A self-oscillation type converter according to claim 3, wherein said switching means comprises a control transistor having a control electrode connected to a connection point between said time constant resistor and time constant capacitor;
a first electrode connected to a connection point between said control resistor and said switching transistor; and
a second electrode connected to a second end of said time constant capacitor.

* * * * *